United States Patent [19]

McMullen

[11] 4,242,031
[45] Dec. 30, 1980

[54] SIDE LOADING AND UNLOADING TRAILER

[76] Inventor: Donald E. McMullen, 10 Elvins Gardens, Belleville, Ontario, K8P 2T3, Canada

[21] Appl. No.: 951,924

[22] Filed: Oct. 16, 1978

[51] Int. Cl.³ .............................................. B60P 1/00
[52] U.S. Cl. ................................... 414/470; 298/18
[58] Field of Search ................. 414/470, 546, 24.5, 414/684, 745; 298/18, 22 P; 280/145, 179 R; 296/8

[56] References Cited

U.S. PATENT DOCUMENTS

| 3,294,354 | 12/1966 | Batey | 280/179 R |
|---|---|---|---|
| 3,446,515 | 5/1969 | Julian, Jr. | 280/179 R |
| 3,655,218 | 4/1972 | Taylor | 298/18 |
| 3,697,045 | 10/1972 | Farley | 280/179 R |
| 3,921,833 | 11/1975 | Grooss | 414/684 |
| 3,922,036 | 11/1975 | Kalsbeck et al. | 414/470 |
| 4,079,996 | 3/1978 | Vansickle | 298/18 |

FOREIGN PATENT DOCUMENTS 227464  10/1958  Australia .................................. 414/470

Primary Examiner—Stephen G. Kunin
Assistant Examiner—Lawrence E. Williams
Attorney, Agent, or Firm—Arne I. Fors; Robert F. Delbridge

[57] ABSTRACT

An apparatus is disclosed for side loading and unloading large objects such as cylindrical fuel tanks from flat bed trailers. Double pivoted links in combination with a bent lever permits lateral loading and unloading from a plane below the level of the trailer bed.

7 Claims, 6 Drawing Figures

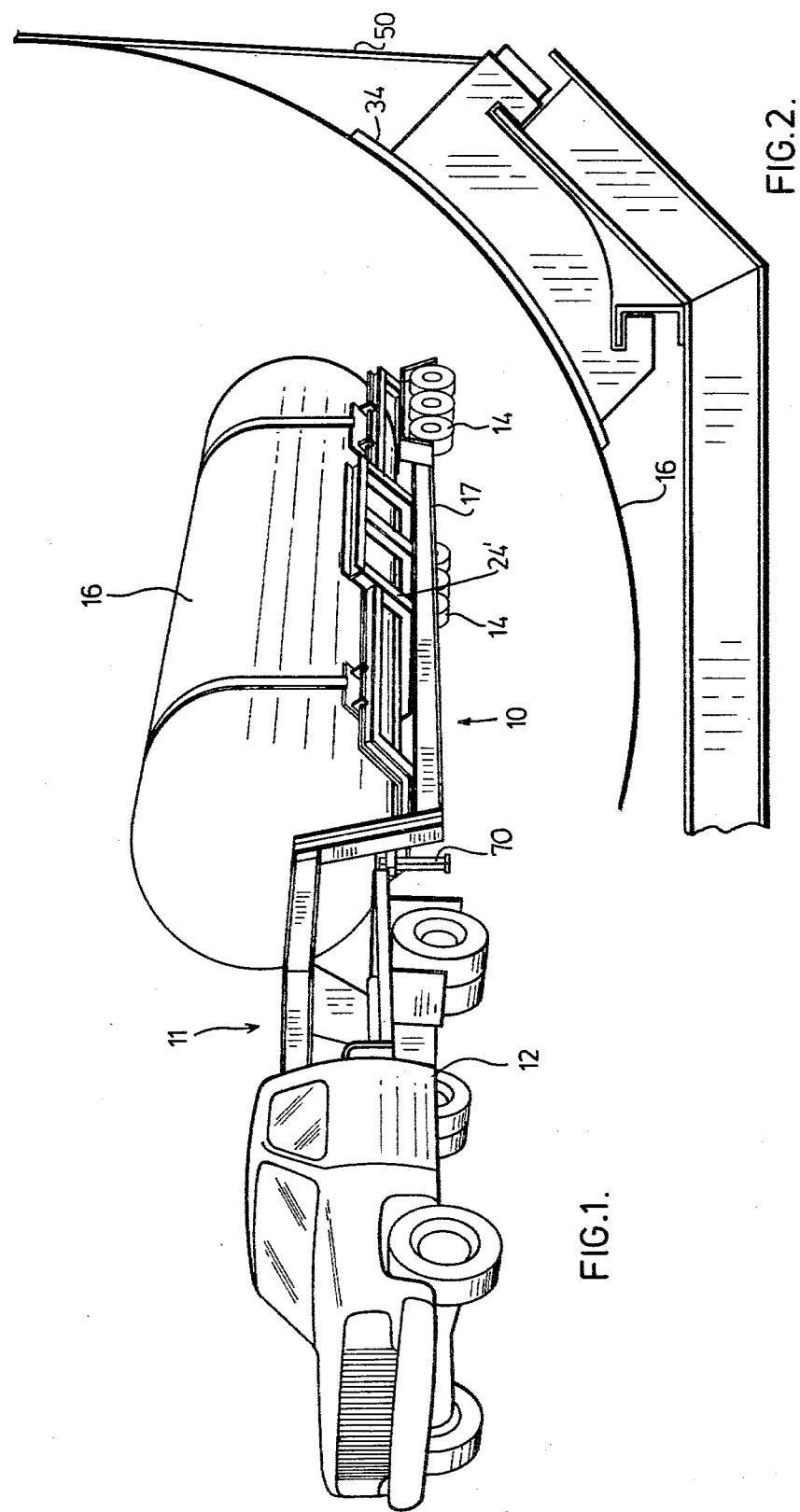

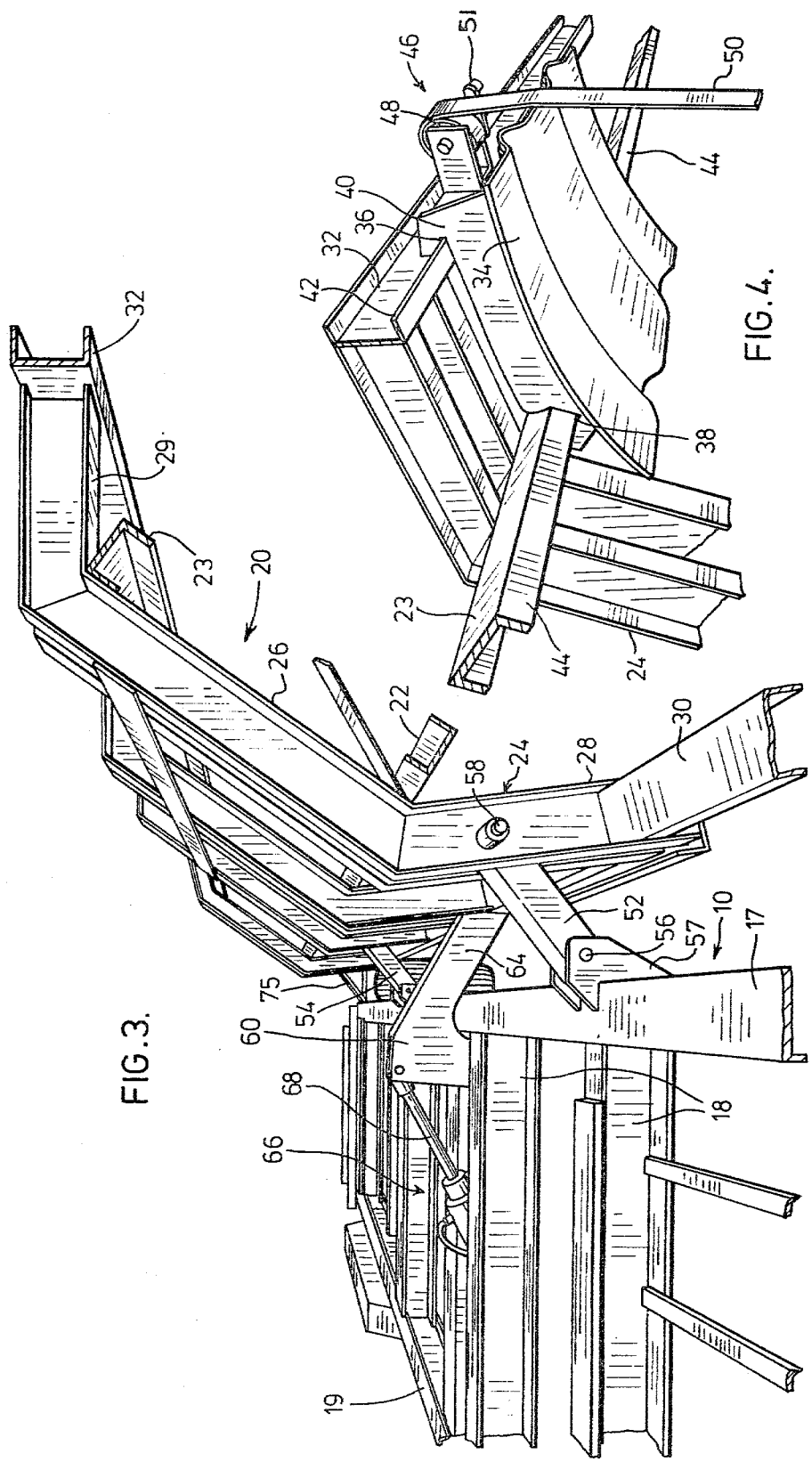

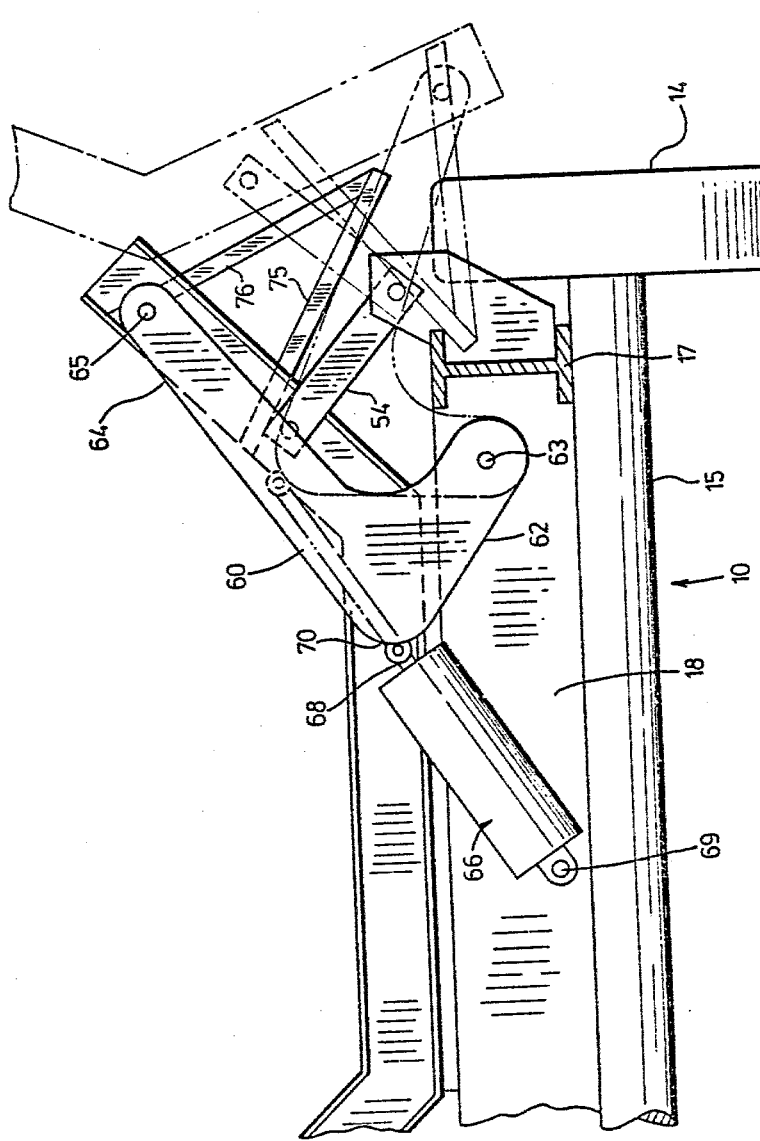

SIDE LOADING AND UNLOADING TRAILER

BACKGROUND OF THE INVENTION

This invention relates to a trailer apparatus and is particularly directed to a trailer apparatus having a load supporting bed pivotally mounted on a trailer frame for outward lateral movement for loading large cylindrical objects thereon and for unloading said objects onto a surface below the horizontal plane of the trailer bed.

U.S. Pat. No. 3,922,036 discloses an apparatus for unloading large cylindrical objects such as hay bales from trailers. This unloading apparatus, however, cannot lower the bales onto the ground at a level below the plane of the trailer bed and thus is unsuitable for loading or unloading large cylindrical objects such as tanks which are easily damaged through mishandling.

U.S. Pat. No. 3,399,791 illustrates a side dumping trailer for unloading rectangular containers and U.S. Pat. No. 3,655,218 shows a side unloading trailer for large, bulky objects. The structures of these patents are not suited for use with cylindrical objects and provide limited lateral transfer.

A problem inherent in conventional side loading and unloading trailers typified by the structure of the foregoing patents is the inability to load and unload cylindrical objects below the horizontal plane of a trailer bed.

It is a principal object of the present invention to provide a side loading and unloading trailer capable of handling cylindrical objects such as tanks.

Another object of the present invention is the provision of a side loading and unloading trailer which can elevate a large cylindrical object such as a tank from the ground for transport onto a trailer bed and which can safely lower said object, if fabricated of brittle material such as plastic reinforced fiberglass, onto the ground at a horizontal plane below the plane of the trailer.

SUMMARY OF THE INVENTION

The structure of the invention comprises, in general, an elongated trailer having a longitudinal frame and at least one transverse axle secured to said frame rotatably mounting vehicle wheels for transport of said trailer, said trailer frame including at least two longitudinal spaced-apart frame members and a plurality of cross frame members interconnecting the longitudinal frame members and rigidly secured thereto, an elongated load-supporting bed normally positioned on said frame, at least two spaced-apart links each pivotally mounted at one end on one side of said trailer frame and pivotally mounted at the other end to the corresponding side of said load supporting bed, an actuating member comprising a bent lever pivotally mounted at one end to form a fulcrum on one side of said trailer frame and pivotally mounted at the opposite end on the corresponding side of said load supporting bed, said pivotal linkages and said actuating mechanism mounted on the same side of said trailer frame and load supporting bed, and a piston-cylinder assembly pivotally mounted at one end on said trailer frame and pivotally mounted at the other end intermediate the ends of the bent lever whereby extension of the piston from the cylinder pivots the load supporting bed about the said links laterally outwardly from the side of said trailer frame and retraction of the piston into the cylinder pivots the load supporting bed about the links laterally inwardly onto the trailer frame.

BRIEF DESCRIPTION OF THE DRAWINGS

The foregoing objects of the invention and the manner in which they can be attained will become apparent from the following detailed description of the drawings, in which:

FIG. 1 is a perspective view of a truck and trailer assembly showing the trailer of the invention having a cylindrical tank loaded thereon;

FIG. 2 is a detailed elevation along the line 2—2 of FIG. 1 showing a load support device and one end of a tie-down mechanism;

FIG. 3 is a detailed perspective view showing the tiltable frame of the invention in its side loading or unloading position;

FIG. 4 is a perspective view showing a detail of the opposite end of the tie-down mechanism shown in FIG. 2;

FIG. 6 is a sectional view, partly in elevation, showing in more detail the piston-cylinder and linkage assembly of the invention illustrated in FIG. 5.

Like reference characters refer to like parts throughout the description of the drawings.

DESCRIPTION OF THE PREFERRED EMBODIMENT

Figure 5:
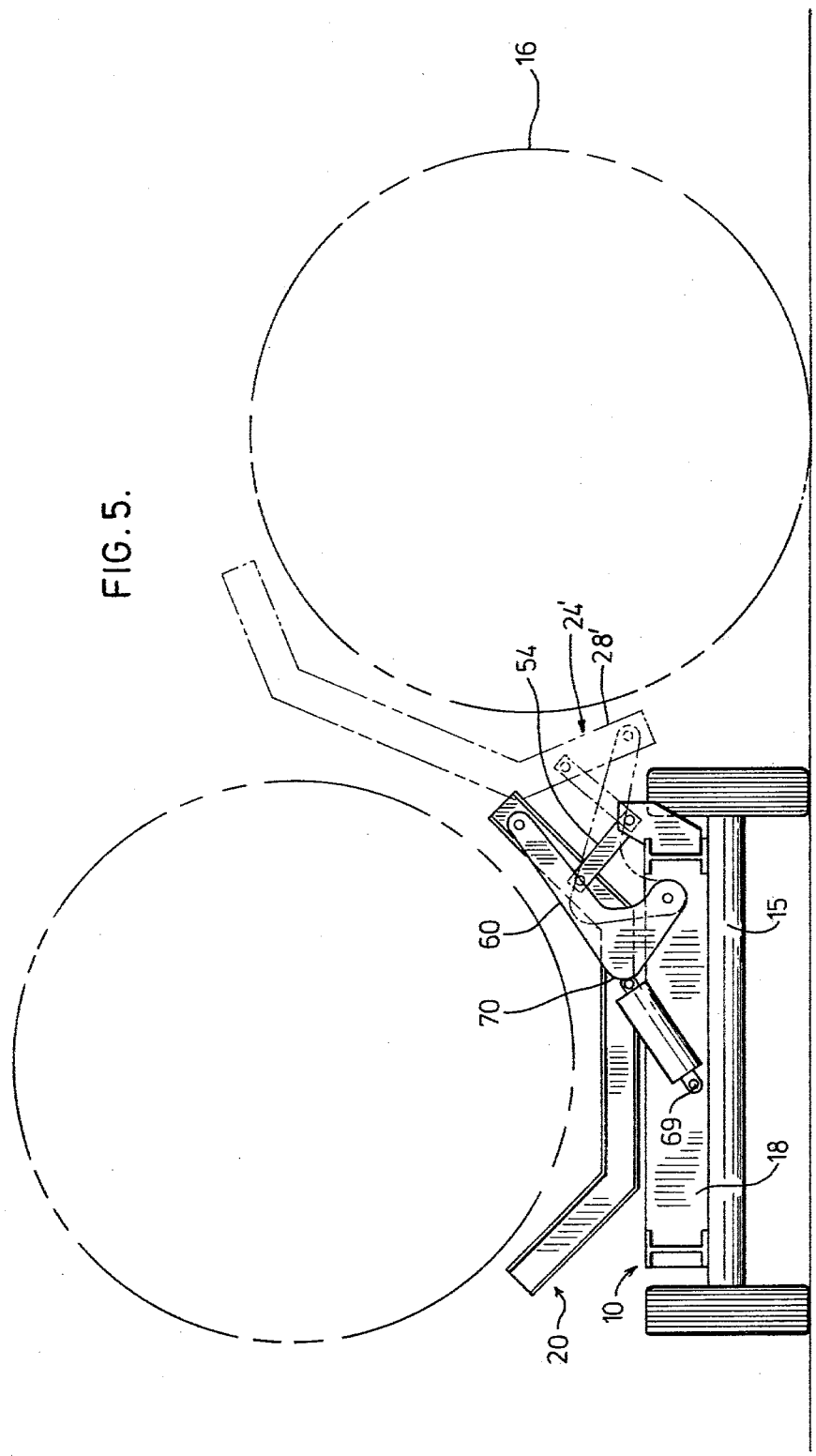
FIG. 5 is a transverse sectional view showing the trailer apparatus of the invention supporting a load in solid lines and in ghost lines in its operative position for receiving or depositing a cylindrical tank.

The trailer apparatus of the invention shown generally in FIG. 1 comprises an elongated frame 10 having at least one set of wheels 14 journalled on transverse axle 15 for transport of the trailer at one end and a support mechanism 11 formed at the opposite end thereof for pivotal connection by means of, for example, a fifth wheel, to a truck 12. Trailer 10 has particular utility in loading, transporting and unloading large cylindrical objects such as storage and pressure tanks designated by numeral 16.

Trailer 10 comprises an elongated frame having longitudinal members 17,19 to which axle 15 is secured. A plurality of cross frame members 18 (FIG. 3) equispaced along the length of members 17,19 and secured thereto such as by welding provide therewith a strong unitary trailer flat bed structure.

Load supporting bed 20 comprises spaced-apart main longitudinal members 22,23 interconnected by a plurality of cross members 24 each having a medial portion 26 to which longitudinal members 22, 23 are secured and end portions 28,29 inclined upwardly from the plane of medial portions 26 preferably interconnected at their free ends by means of additional longitudinal side members 30,32. One side of bed 20 may be laterally extended by elongated cross members 24' shown most clearly in FIG. 1, for reasons which will become apparent as the description proceeds.

Upwardly inclined end portions 28,29 of cross members 24 define with medial portion 26 a generally arcuate shape which accommodates the circular cross-section of tank 16. Longitudinal members 23,32 are designed to receive a pair of arcuate plate sections 34, one of which is shown in FIG. 4, slidably mounted for longitudinal movement on bed 20 by means of slots 36,38 cut in side wall members 40 adapted to receive flanges 42,44 of longitudinal members 32,23 respectively. A pair of similar arcuate plate sections defining a generally concave shape having substantially the same radius of the circular cross section of the cylinder to be transported is slidably mounted on longitudinal members 22,30 on the opposite side of the trailer bed.

Cross members 24 of load supporting bed 20 preferably correspond with and seat on cross frame members 18 of trailer 10 when bed 20 is in its load transporting position shown in FIGS. 1 and 6.

FIGS. 2 and 4 illustrate tie-down devices 46,47 mounted on arcuate-shaped members 34, the former journalled therein, whereby a drum 48 receiving strap 50 extending from device 47 can be rotated by handle 51 to tightly secure the load 16 on bed 20.

With reference now to FIGS. 3, 5 and 6, load-supporting bed 20 is mounted on trailer 10 for lateral pivotal movement by means of at least two spaced-apart links 52,54 each pivotally mounted at one end on longitudinal member 17 in frame 10 by pin 56 in bracket 57 and pivotally mounted at the other end on cross member end portion 28 in bed 20 by pin 58. An actuating member 60, which comprises a bent lever, e.g. an inverted, generally V-shaped lever, is pivotally mounted at the free end of one arm 62 of said lever onto the side of the trailer frame supporting links 52,54, i.e. pivotally mounted onto a cross member 18 in proximity to longitudinal member 17 by pin 63 to form a fulcrum and is pivotally mounted at the free end of the other arm 64 by pin 65 onto the upwardly inclined portion 28' of a cross frame member 24'.

A double-acting piston-cylinder assembly 66 having piston rod 68 extending therefrom is pivotally mounted at 69 onto a cross frame member 18 at one end and onto the apex 70 of the V-shaped lever 60 at the other at a horizontal plane above the linkage connection 63 whereby extension of the piston rod 68 from the cylinder assembly 66 pivots the load supporting bed about the said links 52,54 laterally outwardly from the side of the trailer frame 10 to a position shown in FIG. 3 and illustrated by broken lines in FIGS. 5 and 6. A conventional hydraulic system, well known in the art, actuates the piston-cylinder assembly.

A detent 75 formed by a rod extending laterally downwardly from an end 28 of cross member 24 and braced by a diagonal member 76 is adapted to abut longitudinal member 17 at the completion of lateral pivotal travel of bed 20 to limit pivotal movement thereof.

In operation, the trailer 10 is positioned beside the object to be transported and an outrigger 70, preferably located in each corner of trailer 10, lowered to ground level to support the trailer. Bed 20 is pivoted laterally outwardly and downwardly by extension of piston rod 68 and clockwise pivotal movement of lever 60, as viewed in FIGS. 3, 5 and 6, to abut, for example, cylindrical object 16. Straps 50 extending between tie-down devices 46,47 to encircle object 16 are tightened by rotation of drum 48 to secure object 16 on bed 20 and object 16 elevated onto the trailer frame 10 by double pivotal action of links 52,54 concurrently with pivotal action of actuating lever 60 to clear the side edge of frame 10. Lateral transfer and lowering of object 16 onto the ground at its destination is in like manner easily effected.

The trailer apparatus of the present invention provides a number of important advantages. Large cylindrical objects such as glass fibre reinforced plastic fuel tanks can be loaded onto and off a trailer to a level below the plane of the trailer. Although the description has proceeded with reference to cylindrical objects, it will be understood that large objects of rectangular and irregular shapes can in like manner be easily and safely handled by this apparatus. The load supporting bed would be modified to receive the configuration of the object transported.

What I claim as new and desire to protect by Letters Patent of the United States is:

1. A side loading and unloading trailer comprising, in combination, an elongated trailer having a longitudinal frame and at least one transverse axle secured to said frame rotatably mounting vehicle wheels for transport of said trailer, said trailer frame including at least two longitudinal spaced-apart frame members and a plurality of cross frame members interconnecting the longitudinal frame members and rigidly secured thereto, an elongated load-supporting bed normally positioned on said frame, at least two spaced-apart links each pivotally mounted at one end on one side of said trailer frame and pivotally mounted at the other end to the corresponding side of said load supporting bed, an actuating member comprising a bent lever pivotally mounted at one end to form a fulcrum on one side of said trailer frame and pivotally mounted at the opposite end on the corresponding side of said load supporting bed, said pivotal linkages and said actuating mechanism mounted on the same side of said trailer frame and load supporting bed, and a piston-cylinder assembly pivotally mounted at one end on said trailer frame and pivotally mounted at the other end intermediate the ends of the bent lever whereby extension of the piston from the cylinder pivots the load supporting bed about the said links laterally outwardly from the side of said trailer frame and retraction of the piston into the cylinder pivots the load supporting bed about the links laterally inwardly onto the trailer frame.

2. An apparatus as claimed in claim 1, in which said bent lever comprises an inverted, generally V-shaped lever having a pair of arms joined at an apex of the V shape pivotally mounted at the free end of one arm onto one side of the trailer frame and pivotally mounted at the free end of the other arm to one side of the load supporting bed, and said piston-cylinder assembly pivotally mounted at one end to the apex of the said V-shaped lever.

3. An apparatus as claimed in claim 2, in which said load supporting bed comprises a pair of spaced-apart main longitudinal members interconnected by a plurality of cross members, said cross members having medial portions adapted to seat on the trailer frame cross frame members and upwardly inclined end portions extending from said medial portions defining therewith a generally concave shape for receiving a cylindrical object.

4. An apparatus as claimed in claim 2, in which said load supporting bed has a detent extending therefrom adapted to abut the trailer frame and limit completion of pivotal travel of said bed.

5. An apparatus as claimed in claim 2, in which means are provided on each side of said load supporting bed for strapping and securing a load on said bed.

6. An apparatus as claimed in claim 5, in which said load supporting bed main longitudinal members are channel members having channel flanges facing inwardly towards each other, said bed having longitudinal channel side members outboard of said main longitudinal members with channel flanges facing outwardly, said strapping and securing means each comprising a plate having depending side walls with spaced slots formed in said side walls for receiving flanges of the main and outboard channels whereby said plates can be slidably moved along the sides of the load supporting bed, and straps adjustably secured to at least plates on one side of said load supporting bed.

7. An apparatus as claimed in claim 6, in which said plates have an arcuate shape.

* * * * *